US006826621B1

United States Patent
Kephart et al.

(10) Patent No.: US 6,826,621 B1
(45) Date of Patent: Nov. 30, 2004

(54) METHOD AND SYSTEM FOR AGGREGATING INTERFACE ADDRESSES

(75) Inventors: George Andrew Kephart, Austin, TX (US); David Richard Marquardt, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/557,111

(22) Filed: Apr. 24, 2000

(51) Int. Cl.[7] .............................................. G06F 13/00
(52) U.S. Cl. ...................... 709/238; 709/226; 709/245; 709/250
(58) Field of Search ................................ 709/226, 238, 709/245, 250, 220, 223, 225, 230, 249; 370/395.54, 401

(56) References Cited

U.S. PATENT DOCUMENTS

| | | | |
|---|---|---|---|
| 4,815,074 A | | 3/1989 | Jacobsen |
| 4,947,162 A | | 8/1990 | Kimura |
| 5,668,809 A | | 9/1997 | Rostoker et al. |
| 5,822,523 A | | 10/1998 | Rothschild et al. |
| 5,920,900 A | * | 7/1999 | Poole et al. ................ 711/216 |
| 6,115,385 A | * | 9/2000 | Vig ............................. 370/401 |
| 6,532,217 B1 | * | 3/2003 | Alkhatib et al. ............ 370/252 |
| 6,556,575 B1 | * | 4/2003 | Denio et al. ................ 370/401 |

* cited by examiner

Primary Examiner—Viet D. Vu
(74) Attorney, Agent, or Firm—Volel Emile; Mark S. Walker; Dillon & Yudell LLP

(57) ABSTRACT

A system for effectively reducing address resolution of a packet on a network by representing multiple addresses on a node of the network by a single maskaddress. An aggregation utility is utilized to aggregate the multiple addresses from an address space (i.e., a number of addresses having a common initial bits) of sequential addresses. A pre-selected aggregation percent, representing the percentage of actual addresses from the space which is present on the node, is utilized in the evaluation of the maskaddress. The maskaddress comprises of two variables. The first variable represents the size of the space and the common initial bits. The second variable provides information on the number of relevant bits to include in the maskaddress and the length of the space to point out the actual addresses, which are present in the space. A negative address utility is utilized to indicate which addresses from within the address pace are not hosted on the node. Finally, a comparison utility compares the destination address of network packets with the maskaddress to determine if the packet is addressed to one of the addresses on the node.

18 Claims, 4 Drawing Sheets

METHOD AND SYSTEM FOR AGGREGATING INTERFACE ADDRESSES

BACKGROUND OF THE INVENTION

1. Technical Field

The present invention relates in general to computer based networks and in particular to efficient destination address resolution at a node of a computer based network.

Still more particularly, the present invention relates to a method and system for efficient destination address resolution by aggregating multiple interface addresses at a node of a network into a single representative maskaddress.

2. Description of the Related Art

In communications technology, an address is a unique designation for the location of data or the identity of an intelligent device. Multiple devices on a single communication line must have unique addresses to allow each to respond to its own messages and receive messages from other devices, particularly on more complex or widespread networks.

One of the more versatile and widespread communication networks is the Internet. The Internet is comprised primarily of multiple servers interconnected to each other. Each server has a number of connected clients which communicate with clients or remote servers utilizing Internet Protocol (IP) addressing. Transmitting destination specific data, such as email, represents one of the more common uses of the Internet, as more and more users are appreciating the benefits of almost instantaneous transfer of information.

Currently, it is possible for a single host (such as a web server), to have lots of addresses associated with it. This is referred to as application hosting or web hosting, wherein a single machine may represent thousands of addresses. Occasionally, a node on a network is also designed to support (or host) multiple clients, with each client having a unique identifier or IP address.

Communication on the links are via packets (e.g., IP By packets in a web based network and ethernet packet on a LAN). A communications packet is a group of bits, which includes information bits and overhead bits, and are transmitted as a complete packet on a packet switched network. The overhead bits include a destination address. When a packet is issued unto the network and arrives at a host, which has multiple addresses, the packet's destination address is compared against each of the multiple addresses in a sequential manner. This individual comparison is time consuming and results in a loss of efficiency for network packet transfer, particularly when multiple packets are routed simultaneously to and appear at the host at the same time.

Current IP address are typically 32 bits long. For example, IP address 199.72.6.100 is represented as 11000111 01001000 00000110 01100100. In the 32 bit Internet Protocol (IP) addressing scheme, several billion addresses are possible and a node (or virtual server) is not limited, except for hardware constraints, as to the number of addresses it may support. Some nodes may thus support hundreds of clients each having unique IP addresses. Attempting to locate an address by sequentially checking each address (i.e., all 32 bits) against the packet destination address may involve searching through hundreds or thousands of addresses hosted at the particular node.

For example, in a current systems, if a node supports IP addresses 192.35.45.4, 192.35.45.5, 192.35.45.6, and 192.35.45.7, the packet address is compared to each address sequentially. The comparison is completed at the host-network interface to determine if the packet is addressed to one of the addresses on the host and should be accepted.

The present invention recognizes that it would be desirable to provide a method and system for reducing the processing time for packets destination address resolution on a network. A system which minimized the time required for completing a comparison of a packet's destination address with addresses on a node (or virtual server) by reducing the actual number of comparisons and number of bits required to be compared would be a welcomed improvement. The present invention provides these and other improvements which are heretofore not previously provided.

SUMMARY OF THE INVENTION

The present invention discloses a system for effectively reducing address resolution of a packet on a network by representing multiple addresses on a node of the network by a single maskaddress. An aggregation utility is utilized to aggregate the multiple addresses from an address space (i.e., a number of addresses having a common initial bits) of sequential addresses. A pre-selected aggregation percent, representing the percentage of actual addresses from the space which is present on the node, is utilized in the evaluation of the maskaddress. The maskaddress comprises of two variables. The first variable represents the size of the space and the common initial bits. The second variable provides information on the number of relevant bits to include in the maskaddress and the length of the space to point out the actual ones of the addresses, which are present in the space.

In a preferred embodiment, the system further comprises a negative-address utility by which those addresses which are not present within the space are identified. When a network packet arrives at the node, the destination address is compared against both the maskaddress and the negative address(es) to determine if to accept or refuse the packet.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention is directed to a method for aggregating interface addresses within a computer based network.

Figure 1:
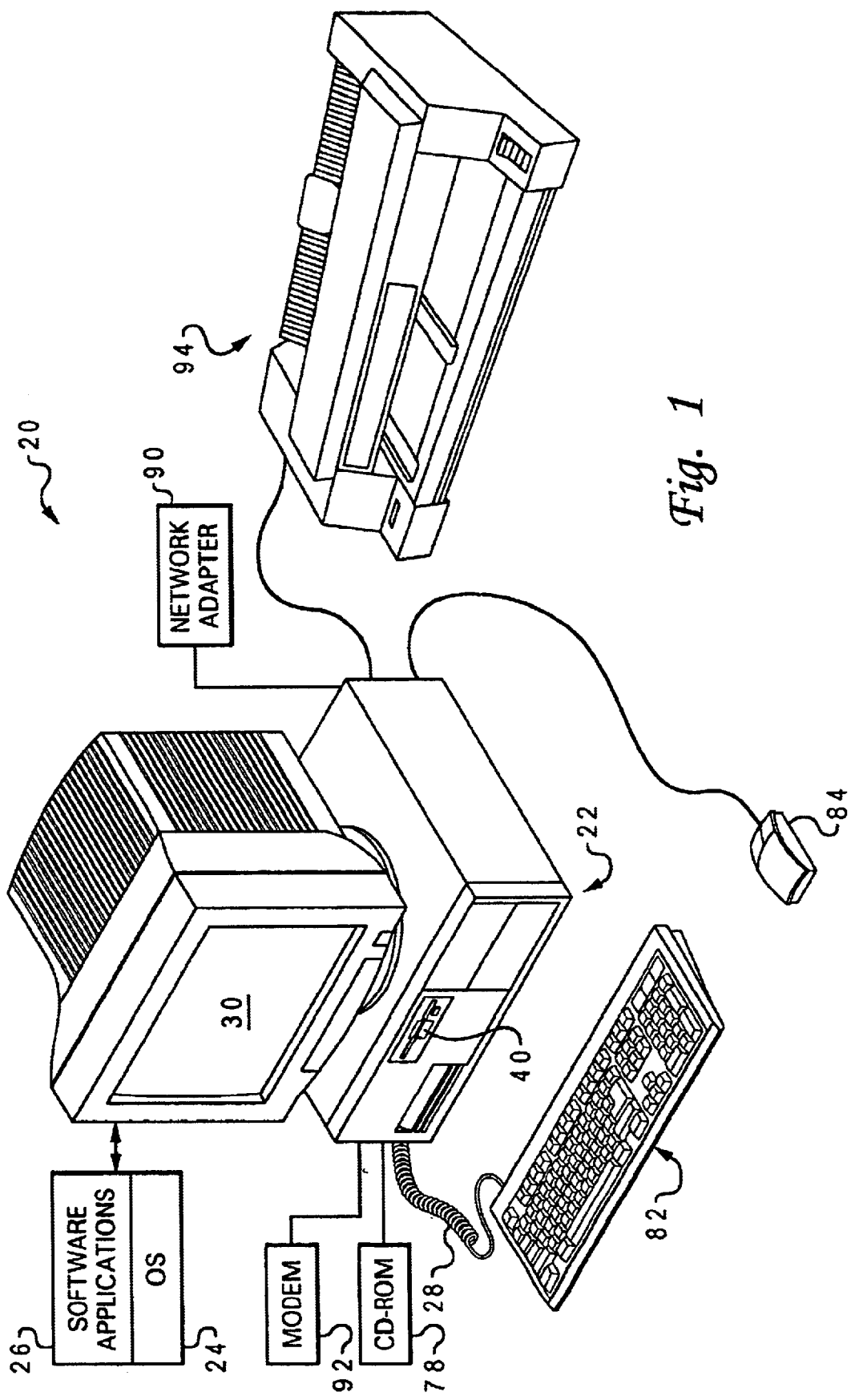
FIG. 1 depicts a data processing system, in which a preferred embodiment of the present invention may be implemented.
Figure 2:
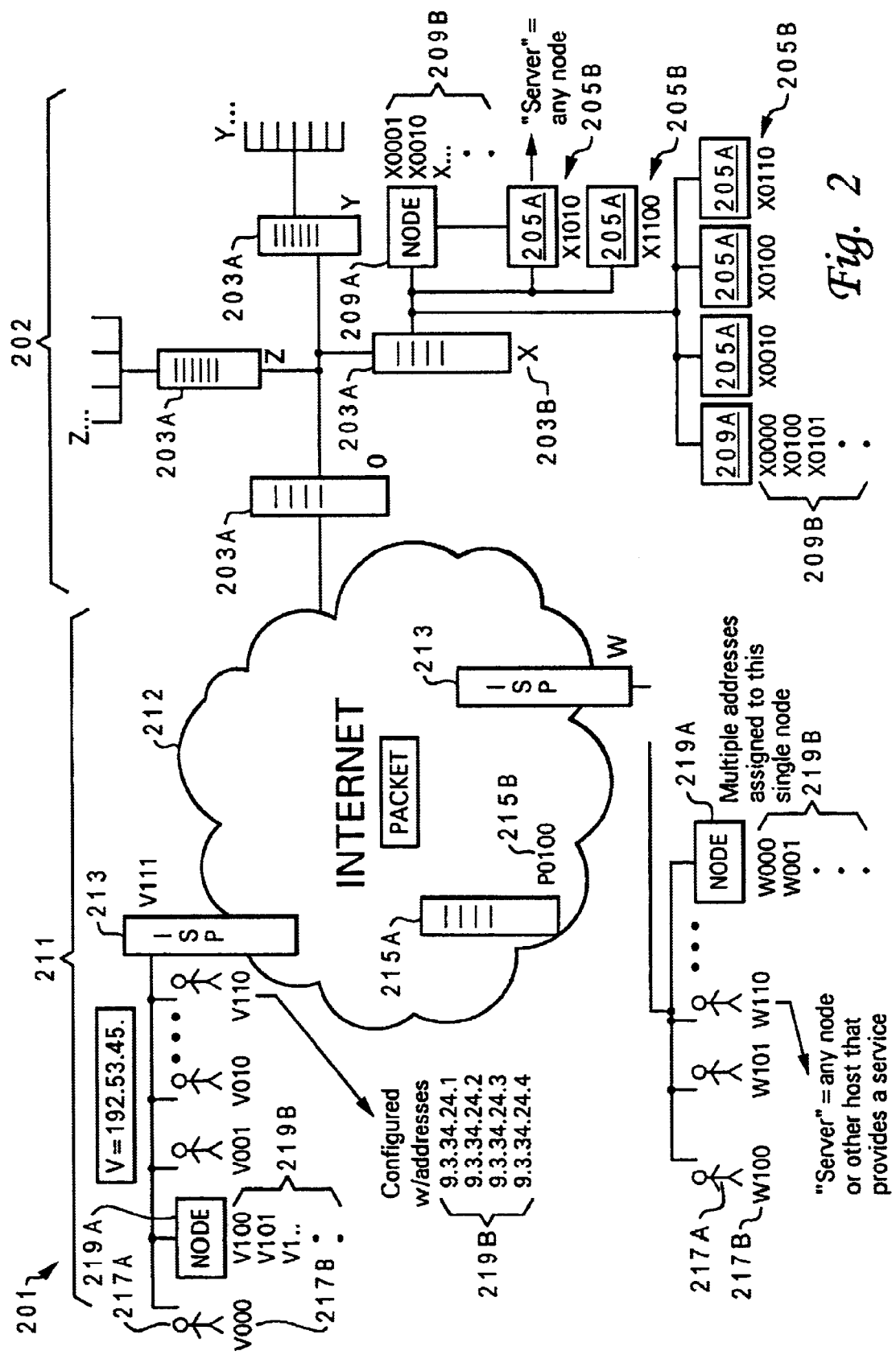
FIG. 2 is a high-level block diagram of an extended wide area network with interconnected Internet and local area network (LAN) in accordance with a preferred embodiment of the present invention.

A computer system on which a preferred embodiment of the invention and a corresponding wide area network (WAN) are illustrated in FIG. 1 and FIG. 2, respectively. The invention may, however, be implemented in other types of data processing systems and networks so, while the present invention may be described with references to the provided figures, these references should not be construed in a limiting sense. For the purposes of this invention, the term client is utilized to refer to both the hardware component which is connected to a network server and the software applications stored in memory and being run on the hardware component. Each client has a corresponding IP address. Additionally, the terms node, host or virtual server as utilized herein refer to a point on the network which provides a service, specifically that of hosting one or more clients or client addresses.

With reference now to the figures and in particular with reference to FIG. 1, a data processing system that may be utilized as a standalone data processing system or one of the client terminals or servers on a network is presented. Data processing system 20 comprises a Central Processing Unit (CPU) housed in a system unit 22. System unit 22 also provides connections for various hardware components including disk drives 40, and memory devices (not shown). Stored within memory devices are the operating system (OS) and software applications by which many of the processes of the invention are implemented as will become clear later. Several peripheral input/output devices are connected to the CPU. These input/output devices include keyboard 82, mouse 84, printer 94, CD ROM 78, and display monitor 30. Display monitor 30 provides a graphical user interface (GUI) which allows a user to view and interact with software applications 26 stored in system memory or provided via a network, by displaying icons or other selectable mechanisms with which the user may interact.

Also coupled to CPU are various external devices, including modem 92, and network adapter 90, both utilized for connecting data processing system 20 to other systems and/or networks, as is illustrated in FIG. 2. CD ROM 78, modem 92, and network adapter 90 are depicted as external components; however those skilled in the arts are familiar with the various structures of data processing system architecture and understand that these components may be housed inside of system unit 22.

Modem 92 is a communication device that enables a computer to transmit information over standard telephone lines or wireless connections such as cellular. Modem 92 converts digital computer signals to interlock signals suitable for communications over these telephone media. Modem 92 can be utilized to connect data processing system 20 to a server via remote access protocols. Modem 92 may also provide a connection to other sources, such as an electronic bulletin board (BBS) or the World Wide Web.

Network adapter 90 may be used to connect data processing system 20 to a Local Area Network (LAN) as depicted within FIG. 2. LAN may consist of a single server or a number of servers and provides network clients with a means of communicating and transferring software and information electronically within the network environment.

Referring now to FIG. 2, a high-level block diagram of an extended wide area network (WAN) is illustrated in accordance with a preferred embodiment of the present invention. The preferred embodiment of the present invention is concerned with the aggregation and subsequent representation of multiple IP addresses located a node as a single maskaddress so that processing time for evaluating a packet on the network is reduced. IP addresses are represented with (1) a header V, W, X, Y, etc., which identifies the addresses with a common physical address/layer, and (2) a 3-bit logical extensions (000–111) of the physical address, identifying the specific client. Thus V001 may represent IP address 192.53.45.1 and V110 may represent IP address 192.53.45.6., etc. Each node hosts several IP addresses (e.g., 192.53.45.4, 192.53.45.7, and 192.53.45.5). The complexity of current networks thus results in multiple physical layers, which have a single header to accommodate each client supported by that header.

WAN 201 includes the Internet (Web) 211 as well as a local area network (LAN) 202. Internet 211 contains a plurality of servers 213 which are connected within a web like structure scattered within a geographically obscure area depicted herein as a cloud 212. The server may be an ISP server 213, having many users 217A and associated IP addresses 217B at a single node. Information server 214A has no direct client connections, but also has an associated web or IP address 214B by which information server 214A may be accessed by remote clients. The preferred embodiment of the invention is concerned with the multiple-address nodes 219A and 209A, which host multiple IP addresses 219B and 209B.

LAN is comprised of a plurality of client systems 205A coupled to central servers 203 via an ethernet, for example.

Central servers 203A and client systems 205A have affiliated IP addresses 203B and 205B, respectively. The invention finds applicability with a multiple-address node of both a LAN system and the Internet as described herein but may be extended to any network structure in which multiple users or clients have associated IP address, which are hosted at a single node in the network.

In the preferred embodiment, Each of the nodes on WAN 201 are computer systems or coupled to computer systems, which have a database, OS, and address-aggregation and interfacing software utility. The invention is implemented utilizing one or more of the following utilities: (1) an aggregation utility; (2) a negative address (anti-address) utility; and (3) an address comparison utility. Although the first two utilities may be utilized independent of each other, the preferred embodiment of the invention utilizes both the aggregation and negative-address utilities together to improve the efficiency of the process and substantially maximize the accuracy of the resulting mask address(es).

In the illustrative embodiments, a 75% aggregation method is utilized. This means that the aggregating utility only aggregates addresses within a space when at least 75% of the possible sequential addresses are present on the node. The various processes of the invention are completed as software code resident on the node's computer system or other computer system connected to the node.

The invention operates to find the smallest address space which encompasses the physical address that includes 75& of the logical addresses. In application of the invention to 32 bit addresses, the first 28 bits may be the same (i.e., encompassing the physical address), with the final four bits being utilized to provide the sixteen (16) individual IP addresses which may be hosted at the node.

The mask address for the 16 IP addresses, using a 75% aggregation method, would include only the first 28 bits.

If only 75% of the bottom eight (i.e., addresses 8–15) address were present at the node, then the mask address would be 29 bits. The 29 bits would comprise the first 28 bits plus an additional bit, "11," which is common to the bottom eight addresses.

The invention requires the aggregation utility to create at least one mask address to represents an entire space of addresses on a single node. In order to begin the aggregate comparison, the aggregation utility first determines which address bit is important. In a 32 bit IP addressing scheme, this involves finding the last bit(s) that are common to all the addresses for a node. Then, the bit is selected so that all the elements in the space have the same primary bit. For example, a set of 32 bit binary addresses with a common first 29 bits would be represented by a mask address comprising the first 29 bits in addition to a second set of values, which indicate which of the eight (8) possible addresses (i.e., 000–111 binary, representing bits 30–32) are present in the space. Thus, the first function of the aggregating utility is to compare the addresses on the node to find commonalities in the initial address bits. Once a commonality is found for a set of the addresses, the address space can be determined and the other functional processes of the aggregation utility completed. In the preferred embodiment, the aggregation and negative address utility are activated when the node is first made to host more than one address or when the utility is loaded into the node computer system. Subsequently, whenever a change occurs at the node, such as addition or removal of a client or IP address, the utilities are triggered to complete the aggregating steps again. These functional processes occur independent of the network and the transmission of packets on the network.

Returning to the above example where a space of 8 possible addresses (i.e., 3 relevant bits) is defined, if the value of all of the first bits is 1 then the space is reduced to four (4) possible addresses (i.e., 4, 5, 6, and 7). Likewise, 0 as the value of the first bit reduces the space to the other four addresses (0, 1, 2, and 3). Thus if the incoming address has a first relevant bit value of 0, there is no match within the aggregate space of 4, 5, 6, and 7. For purposes of simplicity and to ensure clarity, the invention will hereinafter be described with reference to this 8 address space, and in particular to the subset of 4 address space (i.e., 4, 5, 6 and 7).

In the presented 3-bit example, the first bit is most relevant because a value of 1 is required for that bit for an address to be on the node. Any packet destination address with a value of 1 in that bit, would possibly find a match within the space. (Likewise, a 0 value in that bit would be a clear indication that the packet address is not on the node). During the actual comparison, only those bits of the address up to the first bit need to be checked against the first part of the mask address for a match. The other bits are thus eliminated from the network level comparison process. Also, only a single comparison of the destination address with the mask address is required. The invention thus provides a mechanism for optimally aggregating the addresses in a larger space to reduce packet comparison time, which increases overall network efficiency.

In the given example, once a packet appears at the node with a 1 in the position of the first bit, the packet is accepted and subjected to further checks against the other components of the maskaddress. The comparison utility completes a network-level check up to the first bit of the maskaddress, but completes a node-level check against the second and subsequent bit level. This node-level check continues until the packet finds the correct address or the address is determined to be not within the node or nonexistent. Thus, from the network level, only the initial comparison with the mask address is required. Once the destination address matches the maskaddress up to the first bit, all other comparisons occurs internally within the host.

The invention utilizes two variables within its aggregation utility to represent the space and addresses found within the space. These variables and their definitions and/or functional characteristics are:

P: this represents the address space. For example, in the 3 bit address space, P=8 (i.e., 8 possible addresses in the space);

$P_k$ (also referred to herein as the prefix): this represents the particular part of the address space which is important.

$P_k$ contains two pieces of information, (1) the particular setting of bits, and (2) the number of bits which are important or which are in the prefix. For example, a 3 bit address space with the first bit value of 1 has a prefix of 100, where only the first bit is important. Thus the presented example is coded as:

P=100, $P_k$=100/1.

The actual addresses of relevance for the aggregate are 100–111 (4–7), each with a first bit value of 1. The shorter the prefix, the larger the number of relevant addresses that are present at the node and vice-versa. During the comparison of a packet destination address, if the destination address matches a space up to the prefix length, then the destination address is assumed to belong to that node pending further analysis.

A further example, coded P=100, $P_k$=110/2, represents that although the space has 8 possible addresses, the number of relevant addresses in the space is 4, and the first two bits are relevant when comparing the maskaddress with a destination address. This translates to an aggregate, which represents address values 6 and 7.

The following implementation of the invention follows a 75% aggregation rule. Use of a 75% aggregation rule is not meant to be restrictive on the invention and was chosen solely for illustrative purposes. It is preferable to have as high a percent as possible. Thus, ideally a 100% rule would be followed, but this would be impractical in most networks.

The term 75% rule refers to the percentage of the addresses within a given sequential space which is required to be present on the node to be represented by a single mask address. The invention thus attempts to aggregate the largest space with 75% of the address covered. Addresses are typically assigned sequentially, though not necessarily to the same node. Thus when all address between 0–7 in the 3-bit addressing scheme are assigned, the 75% rule requires that at least 6 of the 8 addresses are located at the node to have a representative space of 8. If, for example, only addresses 4, 5, and 7 are present on the node, then the largest representative space is actually 4, and so on. The invention thus first completes a binary search within the entire space to determine the largest prefix with the smallest prefix length having 75% of the addresses. The above example yields values of P=100, and $P_k$=100/1. However, because there are possibly other addresses in the total space not covered in P=100, other aggregating steps must be taken to cover these other addresses as well.

The process of obtaining the 75% aggregate address is an iterative process, wherein each iteration further reduces the space, increases the number of prefixes in that space by a factor of 2, and increases the number of bits in the length of $P_k$ by 1.

Use of an aggregation process with less than a 100% address requirement causes a number of "holes" to appear where the number of addresses are uneven or the addresses are not present on the node sequentially, or the number of address is not a factor of 2. A second utility, the negative-address utility is implemented to account for (or fill) the holes. The various utilities may be nested within each other in or exist as separate functional components of the invention.

From an implementation standpoint, the negative address method is the reverse of the 75% method and actually collects information on which addresses are not present in the total space. In the general example, if only addresses 4, 5 and 7 are present in the space, then a negative prefix exists with a prefix length of 3 and a value of 6.

When a space is identified as not having all of the sequential addresses, the space is further divided to isolate the address not present. Thus prefixes with a prefix length of 2 are checked. The first subspace of 2 (100) with a 2 bit prefix length yields 4 and 5, which are 100% covered (i.e., no holes). The second subspace of 2 (110) with a 2 bit prefix length yields only 7, which is less than 75% covered. The algorithm then moves on to the next iteration level and checks the prefix length of 3 against the next level subspace (111). At this level, only 1 subspace (which represents 7) is greater than 25% uncovered. The negative address utility represents this as $P_k = -111/3$.

The combination of Positive and Negative address spaces ($P_k+ = 100/1$ and $P_k- = 111/3$) completely defines the entire set of addresses from within a particular space which is hosted on the node. The applicability of the present invention is extended to and works more efficiently within larger networks wherein, for example, the addresses are 8 bits long (or longer), representing 256 possible addresses within the total address space.

In yet another example, using a node having addresses 0, 1, 4, 5, 6, and 7. The addresses would aggregate to two addresses 000/2 and 100/1. Similarly, there may be multiple holes in an aggregate. So for example, a node with addresses 1, 2, 3, 4, 5, and 6 would aggregate to three addresses—one positive (000/0) and two negative (–000/3 and –111/3). When the order (i.e., number of bits) increases, the aggregates and holes become nested. A four bit address space, for instance, may present a node having addresses 3 to 15 (i.e., the entire space except addresses 0, 1, and 2). This space may be represented by three aggregates (1) 0000/0 (the entire space because there are more than 75% of the addresses present), (2) –0000/2 (addresses 0, 1, 2, and 3 represents more than 75% negative), and (3) 0010/4. Thus, for each subspace that is identified as a potential aggregated or negative address, the invention continues to divide the space until it is completely described.

An example is now presented of a node, which has at least four virtual servers or clients represented by 32-bit IP addresses 192.35.45.4, 192.35.45.5, 192.35.45.6, and 192.35.45.7, etc. According to the preferred embodiment of the invention, the IP addresses are aggregated into a maskaddress with prefix information. The address that is then represented to the network is 192.35.45.4/30. This maskaddress indicates that the first 30 bits are relevant to the comparison with an incoming packet destination address. The comparison utility makes a single comparison of the maskaddress with the incoming packet destination addresses up to the first 30 bits. Thus, in this example, the invention permits the replacement of the four individual address comparisons with a single, maskaddress comparison. One skilled in the art will appreciate that as the number of aggregated addresses increase, the average time saved per packet will also increase. Applicability of the invention to larger networks having greater numbers of addresses is preferred. By utilizing the aggregated shorthand (maskaddress), an incoming packet can be tested against multiple addresses simultaneously, reducing the per packet overhead of an IP network stack.

Figure 3:
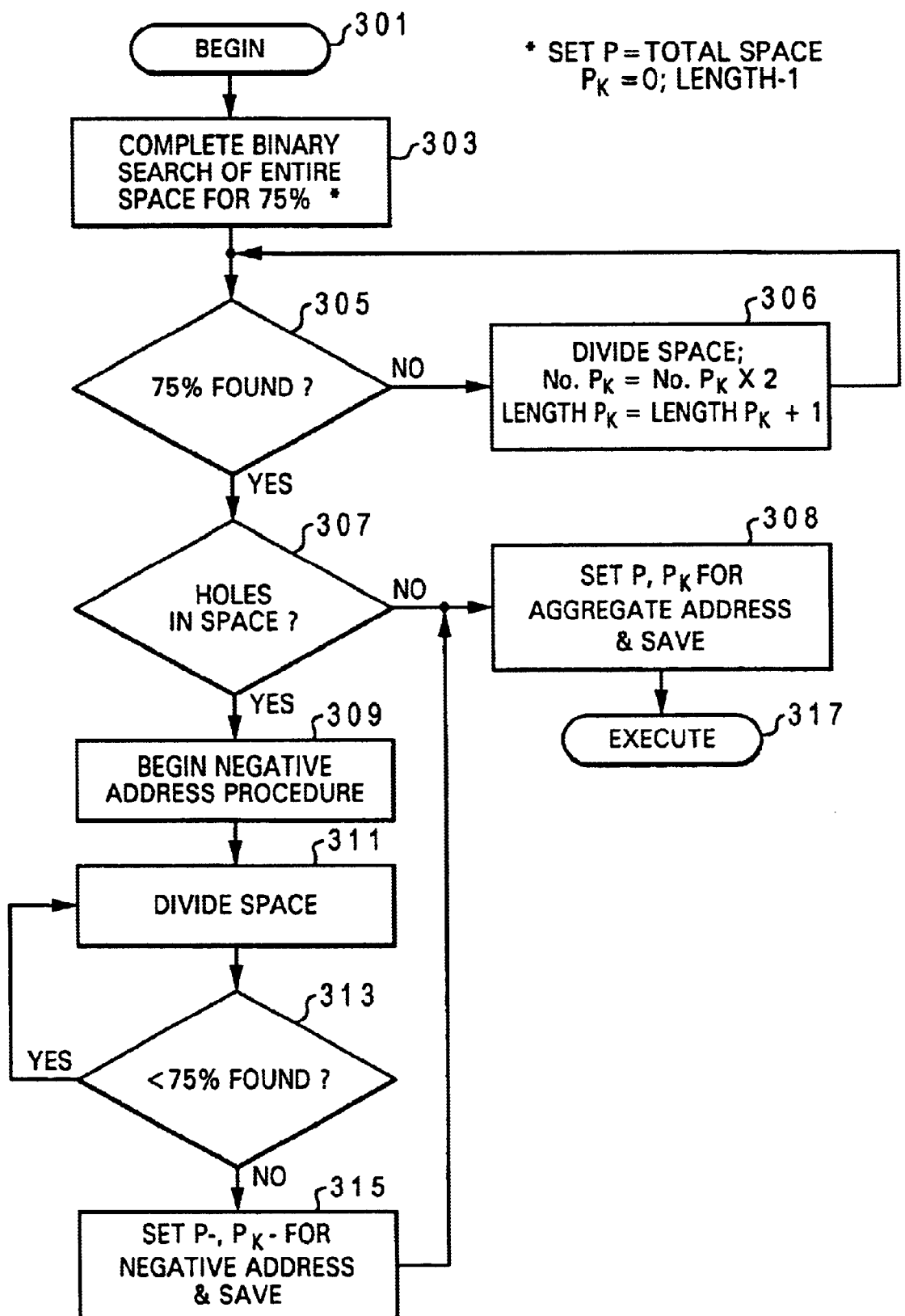
FIG. 3 illustrates a high level logical flowchart of the process of 75% aggregating and negative addressing in accordance with a preferred embodiment of the present invention.

Turning now to FIG. 3, there is presented a flow chart of the processes involved in aggregating addresses according to one preferred embodiment of the invention. Process steps as described are preferably completed by a software-based utility running on a data processing system within the network. The process begins at block 301. An initial binary search of the entire total space on the node is completed at block 303. This search is used to determine whether 75 percent of the addresses are present within the total space at block 305. If 75% is not found, then the total space is divided into sub-spaces at block 306. The number off sub-spaces doubles and the length of each prefix of a subspace increases by 1. This division of the space into smaller unit sub-spaces continues until the query at block 305 yields a positive result. Thus when 75% of the addresses within the space (or sub-space) is present, a second check is made to determine whether there are holes within the space (i.e., missing addresses). If there are no holes within the space (1001 present), then the space size and prefix are saved on the node computer at block 308 and utilized during execution of a packet response at block 317.

If, however, there are holes in the space, a negative addressing process is initiated at block 309. The space is further divided in block 311 as in block 306; however, the subsequent check made is to determine if there is less than 75% (greater than 25% missing) of the addresses in the space at block 313. This represents the condition of interest for the negative address check. When the space no longer has more than 25% of the addresses missing, the negative address values of the space and prefix are set at block 315. The process then proceeds with setting the positive values at block 308. Thus the process of dividing a space both in the aggregation and the negative address method, is an iterative one, which continues until all the addresses within (or not in) the space hosted on the node are accounted for. This may result in multiple mask addresses and multiple negative addresses representing particular sub-spaces within the larger space.

Figure 4:
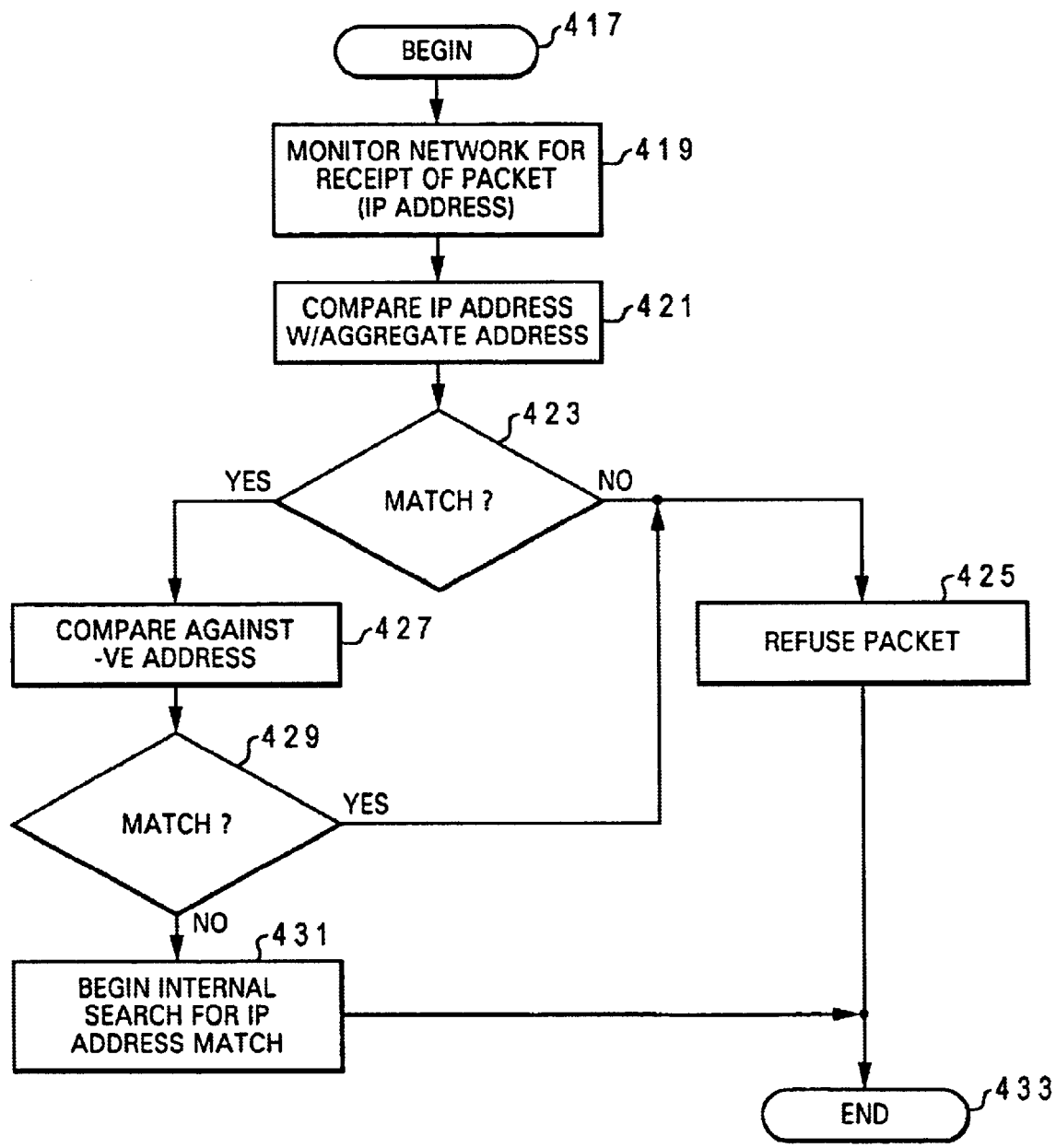
FIG. 4 is a high level logical flow chart of the process of analyzing whether to accept or refuse a packet based on the aggregated and negative addressing scheme in accordance with one preferred implementation of the present invention.

FIG. 4 illustrates the execution process of address resolution on a network once the aggregate addresses have been set. The process begins at block 417. A packet with a specific IP destination address is received at the node at block 419. The node's software logic compares the IP destination address with the mask address (or aggregate address) at block 421. The logic determines if a match exists between the two addresses at block 423. The process of comparing the addresses involves a bit by bit comparison of the addresses beginning with the first or leftmost bit (also referred to as the most significant bit). The comparison continues until the respective bits fail to match or the number of bits in the maskaddress have been compared. If a match does-not exist, then the packet is refused at block 425 and the process ends at block 433. If, however, a match exists, then the destination address is compared with the negative address(es) at block 427 and a determination of a match is completed at block 429. If a match to the negative address(es) exists, then the packet is refused at block 425. Otherwise, the node's comparison utility triggers the node's process for checking internal addresses and locates the specific IP destination address within the node. The packet is then forwarded to the corresponding destination address at block 431. The process ends at block 433.

Those skilled in the arts understand that the above processes are presented as steps which are completed primary by program code. Different process steps may be provided and in a different order than those of FIGS. 3 and 4. The steps as presented in these figures are meant to illustrate only one possible representation of the invention and are not meant to be limiting on the invention.

It is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention. Particularly, while the invention has been described with primary reference to Internet-based network systems, the invention finds applicability in LAN based networked systems, as presented in FIG. 2.

In LAN systems, which utilize address resolution protocol (ARP), each node may support multiple client IP addresses and is connected to a router to determine its machine address stored within a mapping table. When the node supports multiple client IP addresses, it creates a mask address which is forwarded to the mapping table. When the router receives a data packet, it checks its mapping table to see if there is an entry for the IP address received. The router compares the destination address with the mask address and if there is a match, the router creates a packet (such as an Ethernet packet or Token Ring) and transmit the data over the LAN. If there is no match then the router sends an ARP broadcast message over the LAN. Utilizing the processes of the invention, the individual addresses within the mapping table is thus replaced with the maskaddress.

What is claimed is:

1. A system for decreasing latency of destination address resolution of packets at a network node comprising:
   an aggregation utility, for aggregating multiple addresses hosted on said network node into a single representative maskaddress that includes a prefix indicating (number of relevant bits within consecutive addresses utilized within said maskaddress, said aggregation utility including means for creating said maskaddress and prefix when at least two of said consecutive addresses are present within said node; and
   an address resolution utility for determining destination addressed of said packets using said maskaddress.

2. The system of claim 1, wherein said multiple addresses contain at least a single most significant bit in common to create a definable address space of consecutive.

3. The system of claim 2, wherein said aggregation utility comprises:
   means for determining which of said consecutive addresses are present within said node.

4. The system of claim 3, wherein said determining means utilizes a percent aggregation rule.

5. The system of claim 4, further comprising:
   a negative address utility for determining which addresses from within said address space are not present on said network node, wherein a resulting negative address is utilized along with said mask address to efficiently select packets with destination address which are located on said network node.

6. The system of claim 5, wherein said negative address utility comprises:
   means for determining whether a particular percentage of said consecutive addresses are present within said node;
   means for creating said negative address when said particular percentage of consecutive addresses is present in said subspace.

7. The system of claim 1, wherein said address resolution utility includes a comparison utility for comparing said destination address with said mask address.

8. A method for efficient determination of the correct destination of a packet on a network, said method comprising the steps of:
   dynamically creating a maskaddress with a prefix to represent a plurality of consecutive IP addresses located at a node;
   comparing a destination address of said packet with said maskaddress to determine if said destination address is similar to said maskaddress;
   when said comparing step results in a match and a negative address is affiliated with said maskaddress:
   checking said destination address against said negative addresses, wherein said negative address is an address determined to be missing from a group of addresses represented by said maskaddress; and
   rejecting said packet when said destination address matches said negative address; and
   accepting said packet at said node when a match exists between said destination address and said maskaddresses without a match of a negative address to said destination address.

9. The method of claim 8, wherein said creating step further includes the steps of:
   determining when said node contains at least two consecutive addresses, wherein a particular number of possible consecutive addresses represents an address space; and
   aggregating, in response to said determining step, said addresses within said address space to create a single representative maskaddress.

10. The method of claim 9, wherein said aggregating step represents said aggregated addresses as a mask address having an associated space variable and a prefix variable, said space variable indicating a number of addresses within said space, and said prefix variable indicating a number of relevant bits to be utilized for comparisons with a destination address of a packet on said network, whereby input time for processing packets traveling on the network is reduced.

11. The method of claim 9, wherein said aggregating step further includes the steps of completing a percent aggregation of said consecutive addresses within said space which are present on said node.

12. The method of claim 9, wherein said aggregating step further includes the steps of:
   analyzing whether said space has missing addresses; and
   in response to a determination said space has missing addresses, generating a corresponding negative address for each one of said missing addresses, wherein said negative address is utilized along with said maskaddress to determine if a particular destination address is on said node once said maskaddress matches said destination address.

13. A computer program product for effectively decreasing time for destination address resolution of packets at a network node, said program product comprising:

a computer readable medium; and program instructions on said computer readable medium for:

an aggregation utility, for aggregating multiple addresses hosted on said network node into a single representative maskaddress;

a negative address utility, for address from within said address space are not present on said network node and associating a corresponding negative address with said maskaddress, wherein the negative address is utilized along with said maskaddress to more efficiently select packets with destination addresses that are located on said network node; and an address resolution utility for determining destination addresses of said received packets using said maskaddress and said negative address.

14. The computer program product of claim 13, wherein said program instructions for said aggregating utility comprises program instructions for:

creating said maskaddress when said multiple addresses contain at least a single most significant bit in common to create a definable address space of consecutive addresses; and determining a prefix value for said maskaddress that indicates the number of relevant bits within the consecutive addresses to be utilized within said maskaddress.

15. The computer program product of claim 14, further comprising program instructions for utilizing a percent aggregation rule to create said maskaddress.

16. The computer program product of claim 15, wherein said program instructions for said negative address utility includes program instructions for:

determining whether a particular percentage of said consecutive addresses are present within said node;

creating said negative address when said particular percentage of consecutive addresses is present in said subspace.

17. The program product claims of claim 16, wherein said program instructions for said address resolution utility includes program instructions for a comparison utility for comparing said destination address with said maskaddress.

18. The computer program product of claim 14, wherein said program instructions for said percent aggregation rule utilizes a 75 percent aggregation rule.

* * * * *

UNITED STATES PATENT AND TRADEMARK OFFICE
CERTIFICATE OF CORRECTION

PATENT NO. : 6,826,621 B1
DATED : November 30, 2004
INVENTOR(S) : Kephart et al.

It is certified that error appears in the above-identified patent and that said Letters Patent is hereby corrected as shown below:

Column 1,
Line 39, delete "By".

Column 4,
Line 53, delete "75&" and insert -- 75% --.
Line 64, delete ""11,"" and insert -- "1," --.

Column 8,
Line 16, delete "(1001" and insert -- (100% --.
Line 50, delete "does-not" and insert -- does not --.

Column 9,
Line 46, delete "(number" and insert -- a number --.
Line 52, delete "addressed" and insert -- addresses --.
Line 55, after the word "consecutive", insert -- addresses. --.

Column 10,
Line 57, after the word "determination" and before the word "said", insert -- that --.

Column 11,
Line 7, delete ", for address" and insert -- for determining which addresses --.

Signed and Sealed this

Fourth Day of October, 2005

JON W. DUDAS
*Director of the United States Patent and Trademark Office*